United States Patent
Dao et al.

(10) Patent No.: US 7,159,044 B2
(45) Date of Patent: Jan. 2, 2007

(54) INPUT/OUTPUT DEVICE DISABLE CONTROL FOR PC-BASED CONSUMER ELECTRONICS DEVICE

(75) Inventors: Giang H. Dao, Houston, TX (US); Jonathan E. Hayden, Houston, TX (US); Harold A. Vang, Houston, TX (US)

(73) Assignee: Eagle Broadband, Inc., League City, TX (US)

( * ) Notice: Subject to any disclaimer, the term of this patent is extended or adjusted under 35 U.S.C. 154(b) by 377 days.

(21) Appl. No.: 10/825,904

(22) Filed: Apr. 16, 2004

(65) Prior Publication Data

US 2005/0235135 A1    Oct. 20, 2005

(51) Int. Cl.
*G06F 13/00* (2006.01)
(52) U.S. Cl. ............................. 710/8; 710/38; 710/316
(58) Field of Classification Search .............. 710/8–19, 710/34–38, 43–46, 62–64, 72–74, 316
See application file for complete search history.

(56) References Cited

U.S. PATENT DOCUMENTS

| | | | | |
|---|---|---|---|---|
| 6,081,856 A | * | 6/2000 | Comer | 710/67 |
| 6,397,301 B1 | * | 5/2002 | Quach et al. | 711/138 |
| 6,457,069 B1 | * | 9/2002 | Stanley | 710/8 |
| 6,963,642 B1 | * | 11/2005 | Thomasson | 379/406.04 |
| 7,020,764 B1 | * | 3/2006 | Kubota et al. | 712/37 |
| 2001/0052038 A1 | * | 12/2001 | Fallon et al. | 710/68 |
| 2003/0052710 A1 | * | 3/2003 | Lasselet | 326/37 |

\* cited by examiner

*Primary Examiner*—Christopher Shin
(74) *Attorney, Agent, or Firm*—Conley Rose, P.C.

(57) ABSTRACT

An electronic system that includes control logic that causes input and output ports to be disabled during the interruption windows of the initialization process, and subsequently to be selectively disabled or enabled after completion of the initialization process. The input and output ports are disabled during initialization of the electronic system to prevent interruption of the initialization process by the user. The input and output ports are disabled or enabled, after completion of the initialization process, to control access to content stored on, or made available by, the electronic system.

10 Claims, 3 Drawing Sheets

INPUT/OUTPUT DEVICE DISABLE CONTROL FOR PC-BASED CONSUMER ELECTRONICS DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Technical Field

The present subject matter generally relates to selectively disabling one or more input and/or output devices coupled to a host electronic system (e.g., a computer or consumer electronic device). More particularly, the subject matter relates to disabling input/output ("I/O") devices during at least a portion of an initialization process.

2. Background

Consumer electronic devices have become increasing complex. At least some consumer electronic devices incorporate personal computer ("PC") based host systems, thus taking advantage of existing, relatively low-cost hardware and software. Such consumer electronic devices, though perhaps tailored for their specific application, still generally operate in much the same manner as a general purpose PC, such as that used by most people in their homes and businesses. The level of diversification that has resulted from the widespread use of PC-based host systems in consumer electronic devices has resulted in various security-related shortcomings. An example of at least one security issue is provided below.

PC-based host systems generally include a central-processing unit ("CPU") for processing data, random-access memory ("RAM") used to load and run software and store data, and read-only memory ("ROM") used to store a set of permanent, non-alterable programs, referred to as the Basic Input and Output System ("BIOS") software. The BIOS software generally provides a series of low-level programs that allow other programs to access any of the devices within or coupled to the host system. The BIOS software generally also has a series of programs that take care of initializing the host system's hardware, and of performing basic testing to make sure that all the hardware is functioning correctly during, for example, the initialization process. The initialization programs within the BIOS software execute automatically whenever the host system is manually reset or powered on. Once these programs have initialized the host system into a known state, the test programs within the BIOS software are automatically run. The test programs within the BIOS software perform what is known as a Power-On Self-Test ("POST") to test various hardware components within, or otherwise coupled to, the system. If the POST programs detect a failure of any hardware component, the user is generally given the option to proceed despite the failure, or to halt the system completely in order to fix the problem.

Once the POST programs successfully complete testing of the hardware, control is passed to a program commonly referred to as the boot loader software, which is generally loaded into RAM for execution by the CPU from a hard disk, floppy, CD-ROM, or other similar media. The boot loader software then generally loads and begins to run the operating system software installed on the host system. Once the operating system software is running on the host system, any number of system software programs can be run to provide additional security restrictions that can limit the user's access to the host system, or to any content stored on, or made available by, the host system. Such content can include movies, music, e-books, or other similar material that the vendor of the host system may have an obligation to protect. The process thus described, beginning with a manual reset or power-up event ("H/W reset"), and ending with all operating system software and additional system software running, is what is generally referred to as the "boot process," or more broadly as the "initialization process."

Between the initial H/W reset and completion of the initialization process on the host system, there are points where both the BIOS software and the boot loader software generally allow for interruption by a user during one or more interruption windows. The BIOS software generally allows interruption by pressing a single key (e.g., function key 10) or a key sequence (e.g., Ctrl-Alt-Esc simultaneously). Generally, if the key or key sequence is detected by the BIOS software during a short delay period (usually just a few seconds) before the boot loader software is loaded and executed, another set of BIOS software programs are executed, known as the setup programs.

The setup programs within the BIOS software allow a user to alter the basic configuration of a host system, such as, for example, which device to search to locate and load the operating system software. By changing the boot sequence configuration, for example, a user can boot the host system using alternate operating system software from another disk (such as a CD-ROM). This can allow a user to alter the configuration of the vendor-provided operating system software installed on the host system, disable system software installed by the vendor, or even install a user's own software on the host system to bypass the security measures that normally are active on the booted host system. These changes would then go into effect the next time the system was booted.

Boot loader software programs also generally have the same security issues. These programs also generally allow for a user to interrupt the normal boot sequence by pressing a key or key sequence after the boot loader software has started running, but before the operating system software has been loaded. This generally gives the user the option of booting up under one of several versions or modes of the operating system software. Some of these versions or modes can give the user unrestricted access to the host system, since several of these versions or modes (e.g., safe mode under Microsoft Windows) will not start up the vendor's system software. This also can allow a user to make many of the same types of modifications to the vendor-installed operating system software as when using the BIOS software setup programs, but without the need to use alternate operating system software as described above.

BRIEF SUMMARY OF THE INVENTION

The problems noted above are solved in large part by an electronic system that includes control logic that causes input and output ports to be disabled during the interruption windows of the initialization process, and subsequently to be selectively disabled or enabled after completion of the initialization process. In at least one embodiment, the electronic system comprises control logic, and one or more input and output ports coupled to, and independently controlled by, one or more switch logic devices. In other embodiments the electronic system comprises a method wherein values are loaded into a control register, within the control logic, to determine which input and output ports within the electronic system are disabled or enabled, both during, as well as upon completion of, the initialization process.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or wireless connection. Thus, if a first device couples to a second device, that connection may be through a direct electrical or wireless connection, or through an indirect electrical or wireless connection via other devices and connections. In addition, the term "software" is intended to include all programs running on a host system, regardless of the media used to store the software. Thus, programs stored in non-volatile memory (e.g., within a ROM), and sometimes referred to as "embedded firmware," are intended to be included within the definition of the term "software."

DETAILED DESCRIPTION OF THE PREFERRED EMBODIMENTS

The following is a description of the preferred embodiment of the invention in the context of a PC-based host electronic system. However, it should be noted that the principles described herein are not limited to just PC-based host electronic system technology. In general, the apparatus and methods described herein can be applied to numerous types of consumer electronics (e.g., a set top box) and computer devices.

Figure 1:
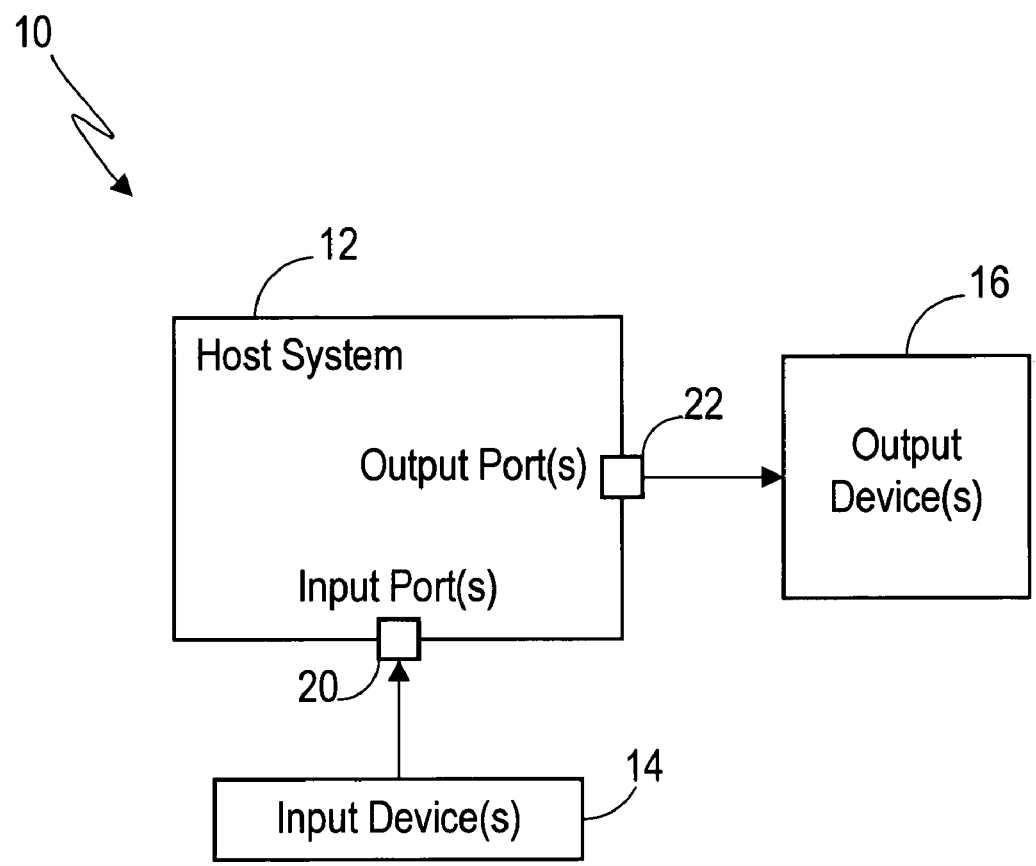
FIG. 1 shows a block diagram in accordance with the preferred embodiment comprising a host system, coupled to one or more input and/or output devices.

Referring now to FIG. 1, electronic system 10 constructed in accordance with the preferred embodiment generally includes a host system 12, one or more input devices 14, and one or more output devices 16. The input devices 14 couple to the input ports 20 of the host system 12, and the output devices 16 couple to the output ports 22 of the host system 12. The host system 12 can be operated by a user operating one or more of the input devices 14. Visual and/or audible output data can be presented to the user via one or more of the output devices 16.

Continuing to refer to FIG. 1, after a H/W reset, the host system 12 can perform an initialization, which may include an initial reset of all hardware, running power-up self-test programs, loading boot loader software, loading operating system software, and loading security software. But the host system 12 may have one or more interruption windows where a user can interrupt the initialization of the host system 12 (e.g., by pressing function key 10). Disabling the input ports 20 during the interruption windows prevents a user from interrupting the initialization of the host system 12, and from thus compromising or circumventing security measures implemented by subsequent portions of the interrupted initialization. Similarly, disabling and enabling the output ports 22 limits access by a user to content stored on, or made available by, the host system 12.

Figure 2:
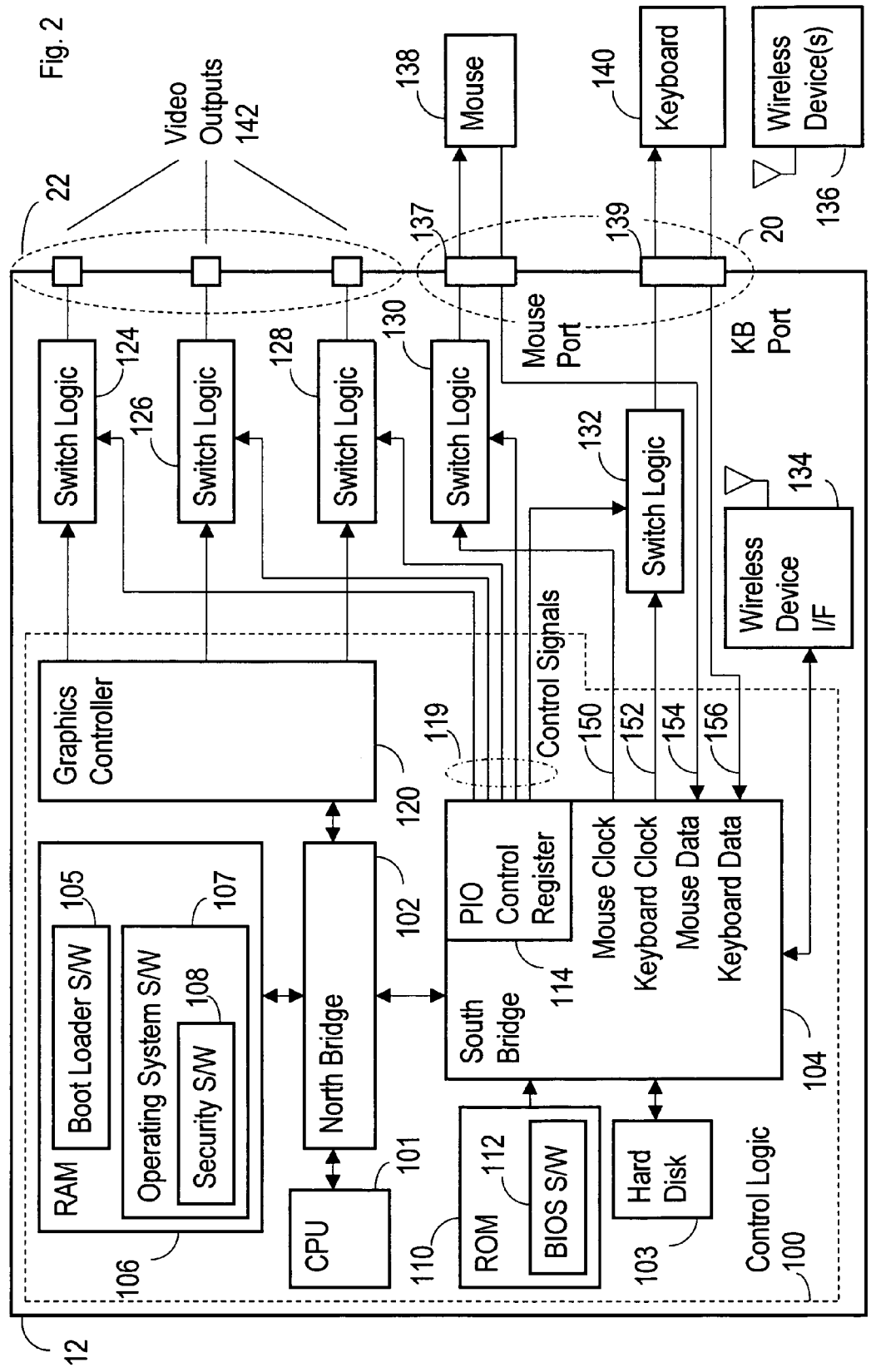
FIG. 2 shows a block diagram of the preferred host system.

FIG. 2 show one embodiment of the host system 12. As shown, host system 12 preferably includes control logic 100 comprising a CPU 101, BIOS software 112 stored in a ROM 110, boot loader software 105 loaded into a RAM 106, operating system software 107 loaded into RAM 106, security software 108 loaded into RAM 106 within operating system 107, and various other electrical components. In the exemplary embodiment of FIG. 2, such other electrical components within the control logic 100 may include a hard disk 103, a north bridge 102, a south bridge 104 including a Programmable Input and Output ("PIO") control register 114, and a graphics controller 120. The host system 12 preferably includes switch logic devices 124, 126, 128, 130 and 132, a wireless device interface 134 (adapted to wirelessly communicate with a wireless device 136), a mouse port 137 (adapted to be coupled to a mouse 138), and a keyboard port 139 (adapted to be coupled to a keyboard 140). The host system 12 also preferably includes one or more video outputs 142 coupled to graphics controller 120 via switch logic devices 124, 126, and 128. Each of the video outputs 142 may be coupled to one of a variety of different types of video displays (not shown). The video outputs 142 may comprise various types of outputs, and can include a video graphics adapter (VGA) output, an S-Video output, a composite video output, and a digital video interface (DVI) output. The host system 12 can include any number of video outputs 142, and the video outputs 142 can be of the same type or of different types in any combination (e.g., two VGA outputs and one S-Video output).

Referring still to FIG. 2, the CPU 101 may couple to the north bridge 102. The north bridge 102 also couples to the RAM 106, the graphics controller 120 and the south bridge 104. The south bridge 104 couples to the hard disk 103, the ROM 110, and the wireless device interface 134. The mouse port 137 is also coupled, by the mouse clock signal 150 (via switch logic device 130) and the mouse data signal(s) 154, to the south bridge 104. Additionally, the keyboard port 139 is similarly coupled, by the keyboard clock signal 152 (via switch logic device 132) and the keyboard data signal(s) 156, to the south bridge 104.

The south bridge 104 includes the PIO control register 114, as noted above, which comprises one or more registers accessible by software running on the CPU 101 (e.g., the BIOS software 112). The PIO control register 114 includes a plurality of PIO bits. In at least some embodiments, each PIO bit is associated with an individual control signal 119. Each of the control signals 119 individually couples to a switch logic device 124, 126, 128, 130, or 132 as shown. Binary values loaded into the control register result in the value of each PIO bit (either a "0" or a "1") determining whether the individual control signal 119 associated with the binary bit is asserted or deasserted. Each control signal 119 controls the state of the associated switch logic device. The state of the individual control signal 119 thus determines whether the corresponding switch logic device disables or enables the input or output port coupled to the switch logic device. The control signals 119 are preferably adapted to couple the PIO control register 114 to the switch logic devices 124, 126, 128, 130, and 132 in such a manner that the default binary value that is loaded into the PIO control register 114 (as the result of a H/W reset) results in the disabling of one or more of the input or output ports. In one embodiment, the PIO control register 114 disables the mouse port 137, the keyboard port 139, and all but one of the video outputs 142 during the initialization of host system 12. One video output 142 remains enabled to display the progress of the initialization to the user.

Still referring to FIG. 2, control signals 119 control the state of switch logic devices 130 and 132, which are adapted to be coupled to mouse 138 (via mouse port 137) and keyboard 140 (via keyboard port 139). Mouse clock signal 150 and keyboard clock signal 152 can thus be independently disabled or enabled by software running on the CPU 101. By allowing the clock signals to be independently disabled or enabled, the corresponding mouse port 137 and keyboard port 139 can likewise be independently disabled or enabled. A device driver preferably included within the BIOS software 112 may, during the initialization process, reject predetermined user inputs received through the wireless device interface 134, which thus may not be disabled in the same manner as the mouse port 137 and the keyboard port 139.

Other control signals 119 within the preferred embodiment of FIG. 2 are adapted to couple the PIO control register 114 to the switch logic devices 124, 126, and 128 to disable or enable each of the video outputs 142, thus providing independent control of each video output. The type of switch logic device used for each video output depends on the type of video signal generated by the graphics controller 120. For example, if a composite video signal is generated, one suitable implementation of the switch logic device comprises an analog switch directly disabling and enabling the composite video stream. Another example of a suitable implementation of the switch logic device is a digital switch disabling or enabling the digital clock that generates the video signals on a VGA output of the type used on a typical PC. The preferred embodiment for the host system 12 can include any combination of the different possible switch logic device types, as appropriate for the types of video data generated by that particular implementation of the host system 12.

Figure 3:
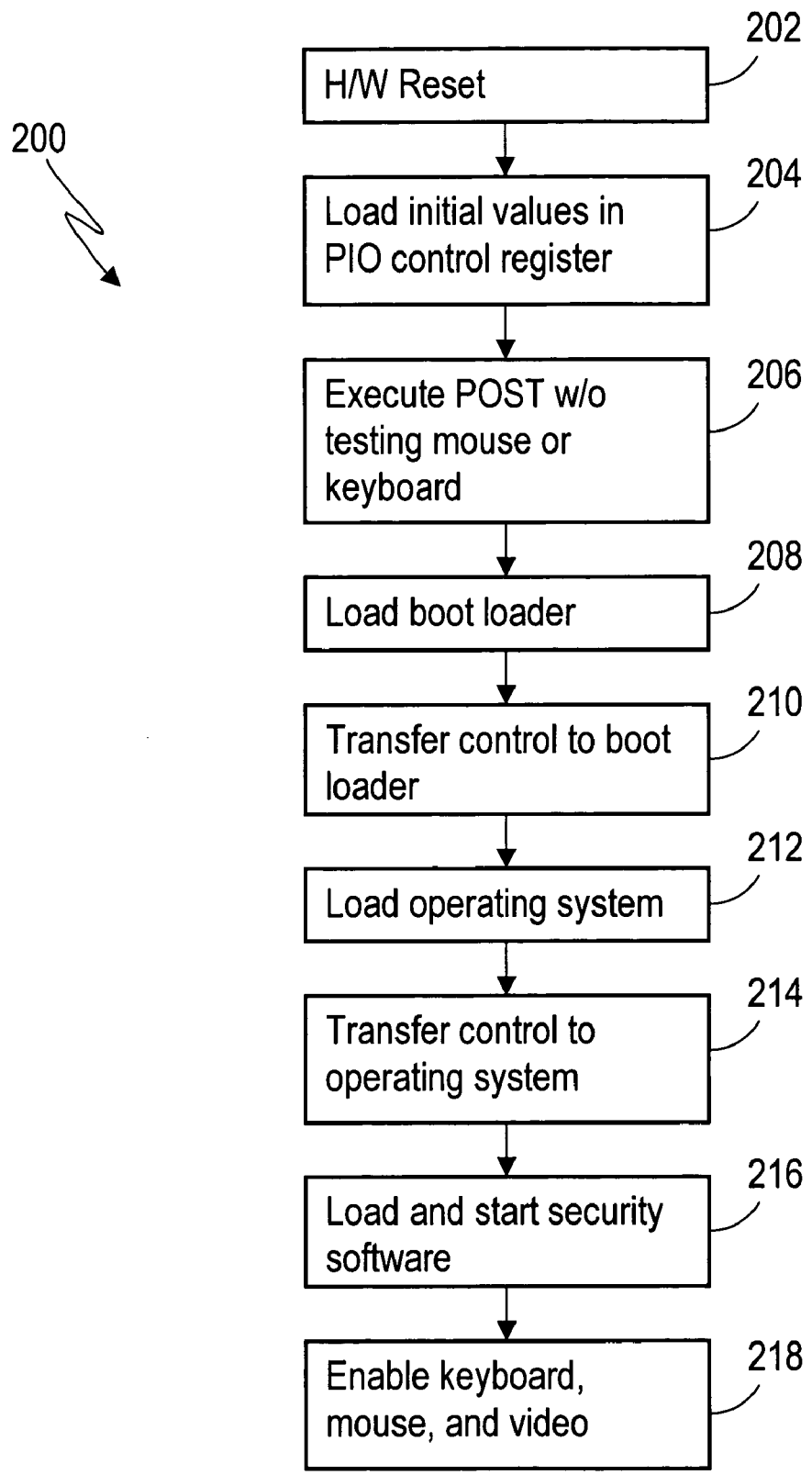
FIG. 3 shows a preferred method illustrating the operation of the host system.

Referring now to FIG. 3, and in conjunction with FIG. 2, method 200 comprises an exemplary method for the host system 12 to control, during the initialization process, the I/O devices coupled to the host system 12. In block 202 the host system 12 is initialized by a H/W reset. Immediately after the H/W reset, the BIOS software 112 sets the PIO control register 114 to its initial value, as shown in block 204. This can be the same value already loaded as a result of the H/W reset, as a precaution against a failure of the hardware to load the correct default value, or a different value overriding the H/W reset default value. Continuing to block 206, the BIOS software 112 then executes the POST programs to test the hardware within, and coupled to, the host system 12, but without testing the mouse 138 or the keyboard 140. Both the mouse port 137 and the keyboard port 139 are disabled at this point in the initialization process by digital switches 130 and 132 respectively, and if the POST programs in BIOS software 112 attempt to test the input devices coupled to these ports, the test will fail.

Still referring to FIGS. 2 and 3, and continuing to block 208, after completing execution of the POST programs, the BIOS software 112 loads the boot loader software 105 from the hard disk 103 into the RAM 106, and then transfers control to the boot loader software 105, as shown in block 210. During this time, from the start of block 208 through the completion of block 210, the switch logic devices prevent the user from interrupting the initialization sequence by activating, for example, the setup programs of the BIOS software 112. Continuing to block 212, the boot loader software 105 loads the operating system software 107 from the hard disk 103 into the RAM 106. The boot loader software 105 then transfers control to the operating system software 107, as shown in block 214. During this time, from the start of block 212 through the completion of block 214, the switch logic devices prevent the user from interrupting the initialization sequence by, for example, selecting alternate operating system software versions or modes available through the boot loader software 105. Continuing to block 216, once the operating system software 107 is loaded and in control of the host system 12, the operating system software 107 loads the security software 108 from the hard disk 103 into the RAM 106. The security software 108 is then started, but the operating system software 107 retains primary control of the host system 12. The security software 108 then loads values into the PIO control register 114 that result in the mouse port 137, the keyboard port 139, and some or all of the video outputs 142 being enabled, as shown in block 218.

The security software 108 continues to run as long as the host system 12 is operating, acting as a filter that limits access to devices coupled to, as well as to content stored on, or made available by, the host system 12. The security software 108 intercepts all access to devices such as, for example, hard disks, where content requiring protection may reside. Operations such as file copies can be blocked or limited by the security software 108 whenever a user attempts such operations. The security software 108 can also select which video outputs 142 to enable. One suitable implementation of the host system 12 includes cables adapted with anti-tamper connectors, used to couple the selected video output 142 to a display device. Such cables, when used with only one video output 142 enabled on the host system 12, would allow the host system to output protected content to a display device (e.g., a movie to a television) while protecting that content from unauthorized duplication through the use of another video output 142, or through the use of the enabled video output 142 already coupled to the display device. The security software 108 may select and enable a video output 142 based on a fixed configuration (e.g., data from a configuration file, or hardcoded values within the security software 108). The selection may also be based on detecting when a video output 142 is coupled to a display device (e.g., by monitoring the characteristic impedance of the various signals at the video outputs 142). The security software 108 may select only one such coupled video output 142, and ignore all subsequently coupled video outputs 142.

The above embodiment is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. An electronic system vulnerable to user interruptions of an initialization process during at least one interruption window, comprising:
- control logic;
- a plurality of switch logic devices independently controlled by said control logic;
- a plurality of input ports, each coupled to a switch logic device; and
- a plurality of output ports, each coupled to a switch logic device;
- wherein said control logic causes said switch logic devices to disable operation of at least one input or output port during said at least one interruption window, thereby preventing interruption of said initialization process by said user.

2. The electronic system of claim 1 wherein said control logic comprises a CPU, a control register accessible by said CPU, and a plurality of control signals adapted to couple said control register to said switch logic devices.

3. The electronic system of claim 1 further comprising software loaded after operation of said at least one input or output port is disabled, and executable by said control logic to reject predetermined inputs from said plurality of input ports.

4. The electronic system of claim 1 wherein said control logic causes said switch logic devices to enable said at least one input or output port after the completion of said initialization process.

5. The electronic system of claim 1 wherein said control logic disables all of said plurality of output ports that are not coupled to an output device.

6. The electronic system of claim 5 wherein the output port that is coupled to said output device includes cables adapted with anti-tamper connectors that preclude a user from removing said connectors from said output port or said output device.

7. The electronic system of claim 1 wherein said plurality of output ports are adapted to couple to display devices.

8. The electronic system of claim 1 further comprising a wireless device interface adapted to communicate with at least one wireless input device wherein said wireless device interface is not disabled by said switch logic devices during said at least one interruption window.

9. The electronic system of claim 8 wherein a device driver rejects predetermined inputs from said at least one wireless input device during said at least one interruption window.

10. The electronic system of claim 1 wherein said electronic system comprises a set top box.

* * * * *